April 16, 1957 T. H. WIANCKO 2,788,665
TWIST TUBE PRESSURE GAUGE
Filed June 25, 1951 3 Sheets-Sheet 1
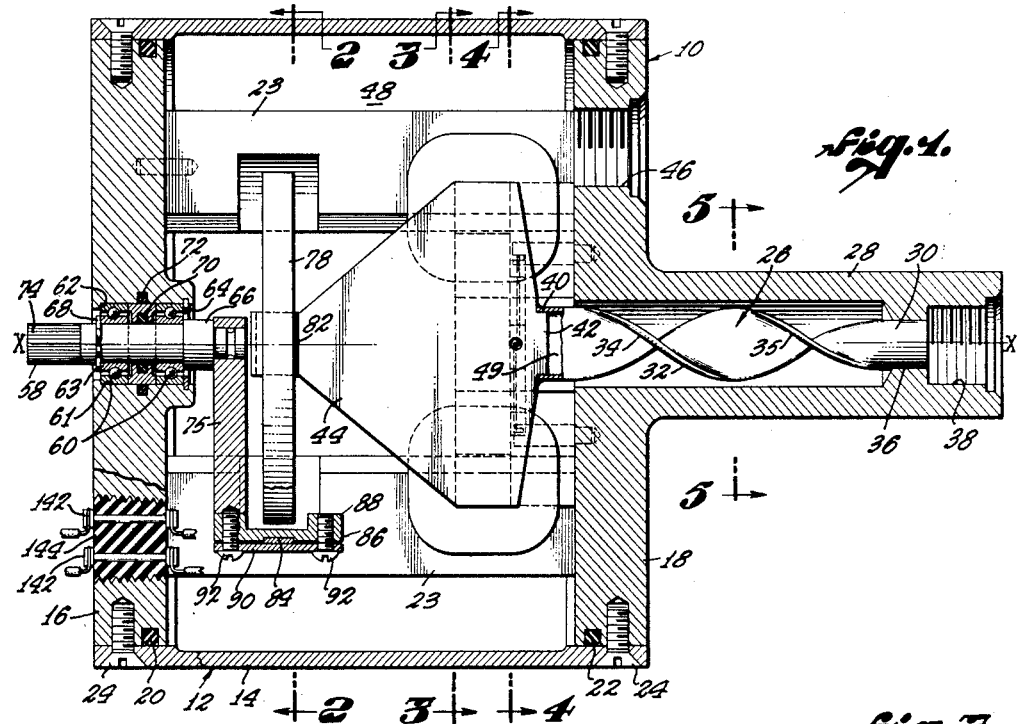
THOMAS H. WIANCKO,
INVENTOR.

April 16, 1957  T. H. WIANCKO  2,788,665
TWIST TUBE PRESSURE GAUGE
Filed June 25, 1951  3 Sheets-Sheet 2
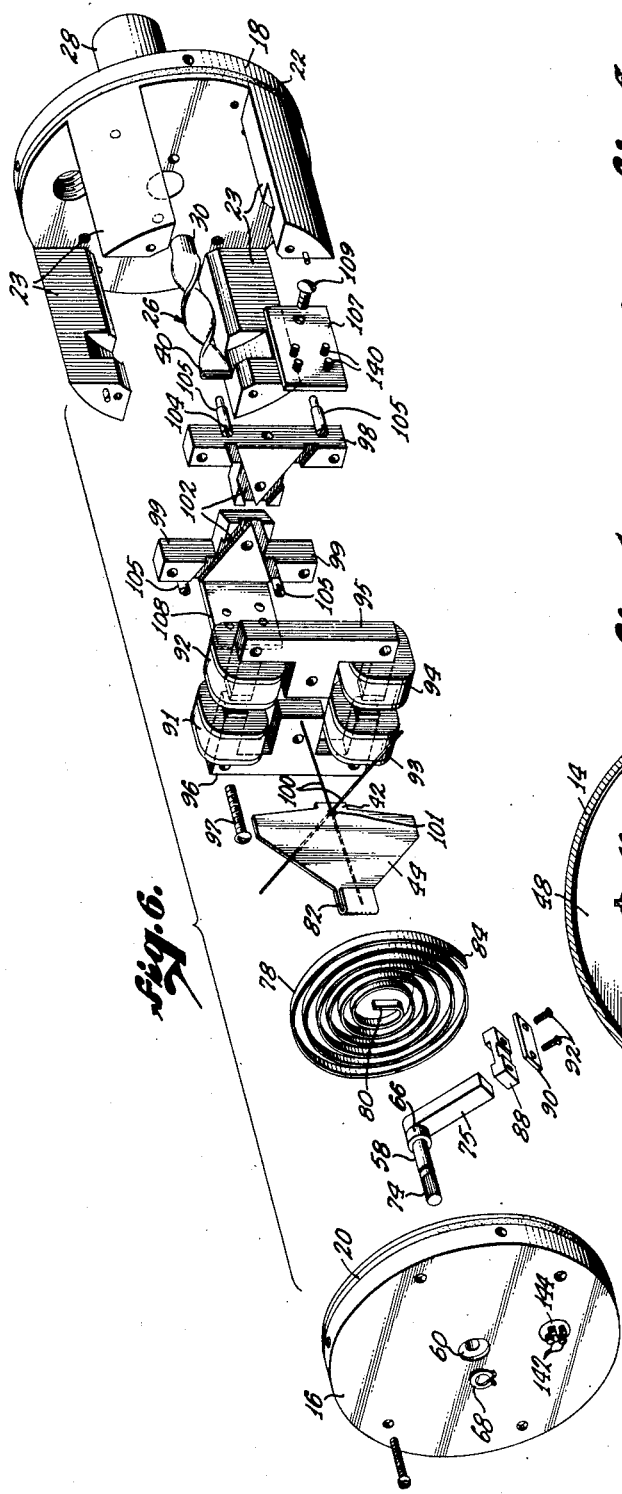
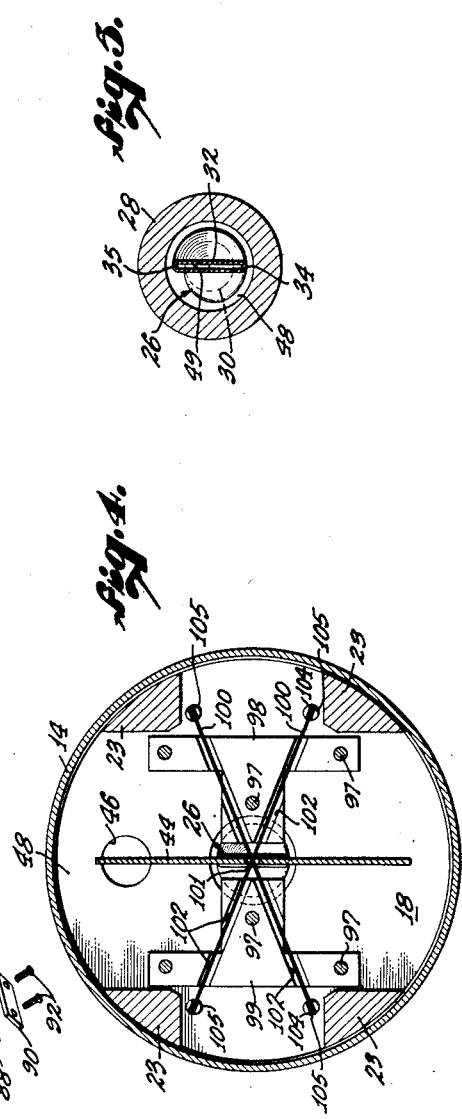
THOMAS H. WIANCKO,
INVENTOR.
BY
ATTORNEY.

April 16, 1957 T. H. WIANCKO 2,788,665
TWIST TUBE PRESSURE GAUGE
Filed June 25, 1951 3 Sheets-Sheet 3
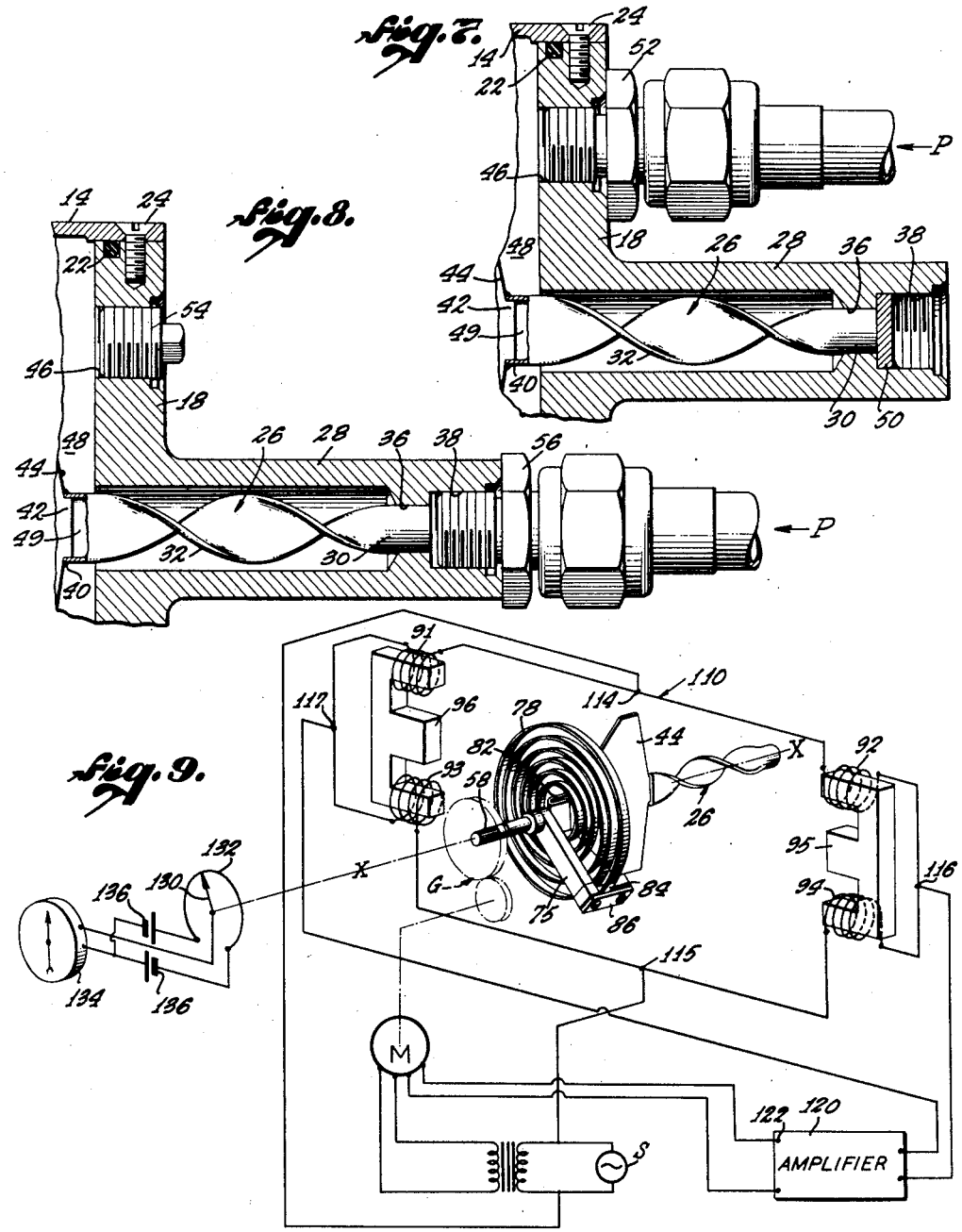
THOMAS H. WIANCKO,
INVENTOR.
BY
ATTORNEY.

United States Patent Office 2,788,665
Patented Apr. 16, 1957

2,788,665

TWIST TUBE PRESSURE GAUGE

Thomas H. Wiancko, Altadena, Calif.

Application June 25, 1951, Serial No. 233,271

11 Claims. (Cl. 73—411)

My invention relates to improvements in systems for making physical measurements and particularly to improvements in pressure gauges.

Though my invention is applicable to the measurement of many other physical phenomena than pressure, it is described herein with particular reference to a pressure gauge employing a twist tube, one end of which rotates about the axis of the tube in response to a change in pressure. In such an instrument the pressure is generally indicated by the degree of rotation of the twist tube. In practice, usually an armature mounted at the end of the twist tube varies the reluctances of magnetic circuits associated therewith in such a way as to cause the output of a bridge circuit to vary with the armature rotation and hence to indicate the pressure being measured. In some instances, instead of measuring the pressure directly by indicating the output of the bridge circuit, it is desirable to control some other device, for example a valve, in accordance with the pressure. Generally speaking, a device which controls the movement of one element in response to a force applied to another element is referred to herein as a transducer.

According to my invention a transducer is provided with an output shaft that is connected by means of a torsion spring to a rotatable element that tends to rotate through the action of a primary torque produced by a physical condition of the phenomenon being measured, such as pressure. In the form of my invention described herein, the rotatable element and the output shaft are mounted coaxially for rotation about a common axis and they are resiliently coupled by means of a spiral spring. The transducer provided by my invention is compact, of light weight, easy to manufacture and repair, and highly reliable in operation. Furthermore, in accordance with my invention, simple, effective and reliable means are provided for automatically adjusting the position of the output shaft to the point where the interconnecting spring applies a counter-torque to the rotatable element that is substantially equal and opposite to the primary torque so that the movement of the rotatable element is greatly reduced.

A pressure gauge embodying the features of my invention is shown by way of example in the accompanying drawings in which:

Figure 1 is a longitudinal sectional view of the pressure gauge;

Fig. 2 is a transverse sectional view on the line 2—2 of Fig. 1;

Fig. 3 is a transverse sectional view on the line 3—3 of Fig. 1;

Fig. 4 is a transverse sectional view on the line 4—4 of Fig. 1;

Fig. 5 is a transverse sectional view on the line 5—5 of Fig. 1;

Fig. 6 is an isometric exploded view of the pressure gauge;

Figs. 7 and 8 illustrate various methods of applying pressure to the pressure gauge; and Fig. 9 is a schematic wiring diagram illustrating an arrangement for automatically adjusting the pressure gauge.

In the drawing, particularly Figs. 1-6 inclusive, there is illustrated a pressure gauge embodying features of my invention and having an axis of symmetry X—X along which a twist tube 26 and an output shaft 58 are coaxially mounted.

The gauge 10 comprises a pneumatically sealed housing, or case, 12, including a cylindrical tubular member 14 having its ends closed by front and rear end walls in the form of end plates 16 and 18 respectively. O-rings 20 and 22 seal the surfaces between the tubular member 14 and the end plates 16 and 18. The end plates are spaced apart a predetermined distance by means of spacer posts 23 and then secured to the tubular member 14 by means of screws 24. Suitable means, not shown, are employed to support the case on an instrument panel or in any desired location.

The twist tube 26 is secured to the inner side of a hollow tubular projection or nose 28 that extends axially outwardly from the rear end plate 18. The twist tube 26 is hollow and of circular cross-section at its outer end 30 tapering inwardly to a main portion 32 in the form of a hollow structure that has an elongated rectangular cross-section. The main portion 32 is twisted about its central axis, which lies on the axis X—X, so that its edges 34 and 35 form helices about that axis. The outer end 30 is soldered firmly in place in a reduced mouth 36 at the inner end of a threaded port 38 located at the outer end of the projection 28. The free, inner end 40 of the twist tube 26 is closed by means of a tongue 42 of a soft iron vane or armature 44 soldered therein.

An auxiliary threaded port 46 is formed in the rear end plate 18 establishing communication with the chamber 48 within the case 12. With this arrangement the free end 40 of the twist tube 26 tends to rotate about the axis X—X of the twist tube by an amount substantially proportional to any difference in pressure existing between the chamber 48 and the space 49 within the twist tube 26.

The twist tube 26 may be made responsive to a differential pressure established between connections made to the two ports 38 and 46. However, if desired, the twist tube 26 may be evacuated and sealed by means of a plug 50, as indicated in Fig. 7, thus rendering the twist tube responsive to the pressure of fluid communicated to the chamber 48 through a fitting 52 threaded to the auxiliary port 46. Likewise, if desired the auxiliary port 46 may be sealed by means of a plug 54 and the twist tube 26 made responsive to pressure of fluid communicated to the interior of the twist tube through a fitting 56 threaded to the main port 38, as indicated in Fig. 8. The arrangement illustrated in Fig. 7 has the advantage over that illustrated in Fig. 8 in that it is not subject to variations in the pressure of fluid caused by changes in temperature of the space in which the fluid is confined. If both ports 38 and 46 are closed or else eliminated entirely, the gauge may be used as a thermometer.

In any event, the twist tube 26 applies to the armature 44 a torque that tends to rotate the armature by an amount substantially proportional to the applied differential pressure and does rotate the free end 40 of the twist tube 26 in the absence of any counter-torque.

The output shaft 58 is rotatably mounted in the front end plate 16 by means of ball bearings 60. The outer race 61 of the ball bearings 60 is secured in the end plate 16 by abutment against the shoulder 62 and by means of a split ring 64. The shaft 58 is secured to the inner races 63 of the bearings by means of a collar 66 and a split ring 68. The shaft 58 and bearings 60 are sealed in the front end plate by means of O-rings 70 and 72. The outer end of the shaft 58 is provided with splines 74 or other suitable means for attaching the shaft to an indicator dial or to gearing, as may be desired. A crank 75 is sweat-soldered to the inner end of the shaft 58 extending radially and at right angles to the shaft.

A spiral spring 78 interconnects the shaft 58 and the twist tube 26 to apply a counter-torque to the twist tube in opposition to the primary torque produced by the twist tube in response to pressure. The inner end 80 of the spring 78 is secured to a U-shaped holder 82 at the front end of the armature 44 and the outer end 84 of the spring is secured to a rearwardly extending spring clamp 86 secured to the outer end of the crank 75.

The spring clamp 86 is formed in part by a stationary finger 88 sweat-soldered to the outer end of the crank 75 and in part by a removable clamping bar 90 secured thereto by means of screws 92. The front end of the armature 44 is bent rearwardly to form the U-shaped holder 82 and the inner end 80 of the spiral spring 78 is flattened, extending radially inwardly, in order that it may be fitted closely and soldered between the legs of the U-shaped holder 82. The outer end 84 is clamped tightly between the stationary finger 88 and the clamping bar 90, being adjustably positioned lengthwise therein in order that the effective torsion constant of the spring may be adjusted to a desired value.

According to my invention, when the twist tube 26 applies a primary torque to the armature 44, the shaft 58 is rotated to apply an opposite counter-torque to the armature that is substantially equal to the primary torque so that the armature 44 does not move substantially from its neutral or zero position. The degree of rotation of the shaft 58 required to produce such a balancing counter-torque is a measure of the pressure acting on the twist tube 26. In practice it has been found possible to select the constants of the spiral spring 78 and the elastic constants of the twist tube 26 in such a way that a complete rotation of the shaft 58 is required to balance a torque that would otherwise cause the armature 44 to rotate only one degree. According to my invention means are provided for detecting movement of the armature 44 from its neutral position and automatically rotating the shaft 58 to counterbalance such rotation.

The detection of the movement of the armature 44 from its neutral position is accomplished by means of four windings 91, 92, 93 and 94 linked with four magnetic circuits that pass through portions of the armature 44. The windings 91, 92, 93 and 94 are arranged on the outer legs of two similar E-shaped magnetic cores 95 and 96 composed of soft iron and symmetrically arranged about the axis X—X. The E-shaped cores 95 and 96 are secured by means of screws 97 to the inner side of the rear end plate 18 and are spaced therefrom by means of a pair of T-shaped spacers 98 and 99. A pair of insulating plates 107 and 108 secured to the spacers 98 and 99 by screws 109 are provided with suitable electric terminals 140 for the windings 91, 92, 93 and 94. Outlet terminals 142 embedded in an insulating member 144 sealed in an opening in the front end plate 16 are provided to establish connections between the windings 91, 92, 93 and 94 and an external circuit.

In order to prevent the armature 44 from being displaced laterally relative to the cores 95 and 96, a frictionless bearing is provided in the form of a pair of crossing wires 100 which extend through and are secured to the inner end of the twist tube by being soldered firmly within an aperture 101 in the armature 44. The two wires 100, 100 are mounted under tension within grooves 102 formed in the front faces of the spacers 98 and 99, the outer ends of the wires being soldered in slots 104 at the outer ends of four posts 105 projecting forwardly from the rear end plate 18. The wires 100, 100 are crossed at about 45° to 60° and the acute angle between them is bisected by the normal to the armature 44. The employment of such a frictionless bearing makes it possible for the pressure gauge to respond to very small changes in pressure. Also, by preventing lateral displacement of the armature when the instrument is measuring pressure or is subjected to transverse vibration or acceleration, errors that would arise from the off-center action of the spring 78 and from variations in the reluctances of the magnetic circuits are avoided. Because of its symmetry and the support provided by the frictionless bearing, the armature resists transverse displacement when the gauge is subjected to acceleration.

The various parts of the pressure gauge 10 are arranged so far as possible to be symmetrical about the axis X—X. In particular, the tubular member 14, the end plates 16 and 18, the shaft 58, and the Bourdon tube 26 are all coaxial with the axis X—X; also the armature 44 lies on the axis X—X, being symmetrical thereto and the two E-shaped cores 95 and 96 and the spacers 98 and 99 are arranged with a four-fold symmetry about the axis X—X. Furthermore, the wires 100 are arranged in a plane perpendicular to the axis X—X. In addition, the spiral spring 78 is arranged in a plane perpendicular to the axis X—X. The spring clamp 86 and the front end 82 of the armature project through that plane to facilitate the desired mounting of the spring 78. The diameter of the nose 28 is smaller than that of the tubular member 14 to conserve space, material, and weight and the nose 28 is made rather long so that the twist tube has high sensitivity for any given pressure. The length of the armature is intermediate the diameters of the two tubular members 14 and 28 and the length of the crank 75 is intermediate their radii.

The four windings 91, 92, 93 and 94 are connected in the arms of a Wheatstone bridge circuit 110 as illustrated in Fig. 9. The respective junctions 114 and 115 between the pairs of adjacent windings 91 and 92 and the pair of adjacent windings 93 and 94 constitute input terminals to which a carrier wave is supplied from a source S of A. C. voltage. The two junctions 116 and 117 respectively between the pair of windings 92 and 94 on one core 95 and between the pair of windings 91 and 93 on the other core 96 constitute output terminals. The impedances of all four windings 91, 92, 93 and 94 are equal both as to resistance and as to reactance so that the output of the bridge circuit is zero when the armature 44 is symmetrically located between the two E-shaped cores 95 and 96.

As the armature 44 rotates from its neutral position, the amplitude of the voltage appearing across the output terminals 116, 117 is substantially proportional to the angular displacement of the armature 44 from its neutral position. The polarity of the output voltage, that is its phase relative to the voltage of the source S, depends on the direction of rotation of the armature 44 from its neutral position. The output voltage is passed through the amplifier 120 to produce a highly amplified voltage at its output 122. The amplifier 120 is designed to have about a 90° phase shift so that the voltage at its output either leads or lags the voltage of the source S by 90°.

A reversible two phase motor M is controlled by the voltage from the carrier wave source S and the A. C. voltage appearing at the output 122 of the amplifier 120, the motor rotating in one direction or the other according to whether the voltage appearing at the output of the bridge circuit is in phase or out of phase with the voltage supplied from the source S. The motor M may be of any type whatever and the amplifier characterized by any phase-shift whatever so long as the direction of rotation of the motor depends on the direction of rotation of the armature 44. The motor may also be of the reversible D. C. type if the amplifier 120 produces a D. C. output having a polarity dependent on the phase of the output of the bridge circuit. The motor M is connected through a train of gears G to the output shaft 58 to cause the shaft to rotate in such a direction that the torque applied by the spiral spring 78 to the armature 44 opposes the deflection of the armature.

A movable contact arm 130 of a slide wire resistor 132 is driven by the shaft 58 and the position of the shaft is indicated by a galvanometer 134 connected between the contact arm and a pair of batteries 136 that are in series with the slide wire resistor.

In practice it has been found that the constants of the spiral spring 78 may readily be so chosen that the shaft 58 rotates 360° in response to the same pressure change that would otherwise cause the armature 44 to rotate only one degree and that the constants of the bridge circuit, amplifier, and gears may be so chosen as to reduce that armature deflection to less than 1/1000°, so that in effect the armature remains substantially stationary. It will be noted that this effect is achieved in part by selecting a spring having a torsion constant very small compared with that of the twist tube itself and by employing a follow-up system including the amplifier and bridge circuit, motor, and gears, that is sensitive to very minute changes in the angular position of the armature. Such reduction of armature movement has the advantage of minimizing the non-linearity of response that might otherwise occur in the bridge circuit over a wide pressure range, especially because of the geometry of the magnetic circuits, and the advantage that errors due to fluctuations in voltage of the source are almost entirely eliminated, since the balance position of the output shaft for a given pressure is substantially independent of the voltage applied to the bridge circuit. Furthermore, the effects of elastic hysteresis of the Bourdon tube are minimized.

Although my invention has been described above with reference to only one particular embodiment thereof, it will be obvious that my invention is not limited thereto but is capable of a wide variety of mechanical and electrical embodiments. Various changes which will now suggest themselves to those skilled in the art may be made in the form, details of construction, and arrangement of the parts without departing from the spirit of my invention. Furthermore, it will be apparent that my invention may be applied to the measurement of other physical forces or phenomena than pressure and that the armature may be made to rotate in accordance with a primary torque produced by other physical conditions than pressure.

Though I have described my invention above only with reference to an automatic follow-up system for rotating the output shaft to produce the desired counter-torque, it is clear that the counter-torque may be applied to the shaft manually or by other mechanical means, it only being important that the counter-torque produced by the spiral spring equalize the primary torque to such an extent that the rotatable element does not depart substantially from its neutral position when the magnitude of the pressure or other physical condition is being measured. It is therefore to be understood that my invention may be embodied in many other forms than that specifically described herein and may be applied in many other ways than that illustrated. Reference is therefore to be had to the appended claims to ascertain the scope of my invention.

I claim as my invention:

1. In a pressure gauge: a housing including a tubular member closed at opposite ends by first and second end walls; a twist tube mounted on one of said end walls and extending into the space within said housing, the inner end of said twist tube being adapted to rotate about the axis of said twist tube in response to a difference in the pressure inside and outside said twist tube, the axis of said twist tube lying on the axis of said housing; a holding element supported by said twist tube and projecting toward said other wall along said axis; a shaft extending through the other end wall and mounted for rotation therein, the axis of rotation of said shaft lying on the axis of said housing; a crank secured to the inner end of said shaft and extending transversely thereof, said crank having a finger at the outer end thereof extending toward said one end wall, said finger being offset from said holding element in a direction normal to said axis; a spiral spring having its outer end secured to said finger and its inner end secured to said holding element, said spring being arranged in a plane normal to said axis; and means for detecting rotation of the inner end of said twist tube.

2. In a pressure gauge comprising: a housing including a tubular member closed at opposite ends by first and second end walls; a twist tube mounted on one of said end walls and extending into the space within said housing, the inner end of said twist tube being adapted to rotate about the axis of said twist tube in response to a difference in the pressure inside and outside said twist tube, the axis of said twist tube lying on the axis of said housing; an armature mounted transversely on the inner end of said twist tube, a holding element at the end of said armature remote from said twist tube, said element projecting toward said other wall along said axis; a shaft extending through the other end wall and mounted for rotation therein, the axis of rotation of said shaft lying on the axis of said housing; a crank secured to the inner end of said shaft and extending transversely thereof, said crank having a finger at the outer end thereof extending toward said one end wall, said finger being offset from said holding element in a direction normal to said axis; a spiral spring having its outer end secured to said finger and its inner end secured to said holder, said spring being arranged in a plane normal to said axis; and means for detecting rotation of said armature about the axis of said twist tube.

3. A pressure gauge as defined in claim 2 comprising a frictionless bearing supporting the inner end of said twist tube to prevent lateral movement thereof without interfering with small rotations thereof.

4. A pressure gauge as defined in claim 3 wherein said frictionless bearing comprises a pair of crossing wires secured to the inner end of said twist tube, said wires being under tension.

5. A pressure gauge comprising: a housing including a main tubular member closed at opposite ends by first and second end walls, one of said end walls having a hollow elongated auxiliary tubular member projecting axially therefrom, said auxiliary tubular member having a diameter small compared with that of the main tubular member; a twist tube secured to the outer end of said auxiliary tubular member extending into the space within said housing opposite said main tubular member, the inner end of said twist tube being adapted to rotate about the axis of said twist tube in response to a difference in the pressure inside and outside said twist tube, the axis of said twist tube lying on the axis of said housing; a magnetic armature mounted transversely on the inner end of said twist tube, said armature having a length intermediate the diameters of said two tubular members; a pair of magnetic circuit elements located within said housing on opposite sides of said axis adjacent the ends of said armature, said magnetic circuit elements being spaced by gaps from said armature and constituting parts of a pair of magnetic circuits, the reluctances of which vary in opposite directions as said armature rotates about said axis; a shaft extending through the other end wall and mounted for rotation therein, the axis of rotation of said shaft lying on the axis of said housing; a crank secured to the inner end of said shaft and extending transversely thereof, said crank having a finger at the outer end thereof extending toward said one end wall, said finger being offset from said holding element in a direction normal to said axis, the length of said crank being intermediate the radii of said two tubular members; and a spiral spring having its outer end secured to said finger and its inner end secured to said holder, said spring being arranged in a plane normal to said axis.

6. A pressure gauge comprising: a housing; a twist tube mounted at one end of said housing and extending inwardly thereof, the inner end of said twist tube being adapted to rotate about the axis of said twist tube in response to a difference of pressure inside and outside said twist tube; electrical signal producing means responsive to the rotation of the inner end of said twist tube relative to said housing for detecting such difference in pressure and producing a signal that varies in accordance with the degree of variation in position of said inner end from a neutral position, said signal producing means including a first element carried by said housing and a second element carried by the inner end of said twist tube, said second element being adapted to move relative to said first element and to produce an electric signal in accordance with both rotational and transverse movement of said second element relative to said first element; and a frictionless bearing comprising transversely extending flexural means connected between said housing and the inner end of said twist tube supporting the inner end of said twist tube to prevent transverse motion thereof while permitting rotation thereof.

7. A pressure gauge comprising: a housing; a twist tube mounted at one end of said housing and extending inwardly thereof, the inner end of said twist tube being adapted to rotate about the axis of said twist tube in response to a difference of pressure inside and outside said twist tube; means responsive to the rotation of the inner end of said twist tube relative to said housing for detecting such difference in pressure; and transversely extending wire means connected between said housing and the inner end of said twist tube for supporting the inner end of said twist tube to prevent transverse motion thereof while permitting rotation thereof.

8. A pressure gauge comprising: a housing; a twist tube mounted at one end of said housing and extending inwardly thereof, the inner end of said twist tube being adapted to rotate about the axis of said twist tube in response to a difference of pressure inside and outside said twist tube; a pair of wires secured under tension to said housing and extending transversely of the axis of said twist tube, said wires crossing each other adjacent the inner end of said twist tube and being secured to said inner end to prevent transverse motion thereof while permitting rotation thereof; and means responsive to the rotation of the inner end of said twist tube relative to said housing for detecting such difference in pressure.

9. A pressure gauge comprising: a housing; a twist tube mounted at one end of said housing and extending inwardly thereof, the inner end of said twist tube being adapted to rotate about the axis of said twist tube in response to a difference of pressure inside and outside said twist tube; an armature secured to the inner end of said twist tube; means defining a magnetic circuit including a portion of said armature for detecting rotation of said armature about said axis, said armature having a hole in it adjacent the inner end of said twist tube; and a pair of wires secured under tension to said housing and extending transversely of the axis of said twist tube, said wires passing through said hole and crossing each other in said hole, said wires being secured to said armature to prevent transverse motion thereof while permitting rotation thereof.

10. A pressure gauge comprising: a housing; a twist tube mounted at one end of said housing and extending inwardly thereof, the inner end of said twist tube being adapted to rotate about the axis of said twist tube in response to a primary torque produced at said end by a difference of pressure inside and outside said twist tube; a frictionless bearing comprising transversely extending flexural means connected between said housing and the inner end of said twist tube supporting the inner end of said twist tube to prevent transverse motion thereof while permitting rotation thereof; a shaft rotatably mounted in said housing; resilient torque-applying means connected between said shaft and the inner end of said twist tube; detecting means responsive to rotation of the inner end of said twist tube relative to said housing for producing an electrical output having a magnitude that varies in accordance with such rotation of the inner end of said twist tube; and means controlled by the output of said detecting means for rotating said shaft in such a direction and in such an amount as to cause said torque-applying means to produce a counter-torque on said inner end to substantially neutralize rotation of the inner end of said twist tube.

11. A pressure gauge comprising: a housing; a twist tube mounted at one end of said housing and extending inwardly thereof, the inner end of said twist tube being adapted to rotate about the axis of said twist tube in response to a primary torque produced at said end by a difference of pressure inside and outside said twist tube; transversely extending wire means connected between said housing and the inner end of said twist tube for supporting the inner end of said twist tube to prevent transverse motion thereof while permitting rotation thereof; a shaft rotatably mounted in said housing; resilient torque-applying means connected between said shaft and the inner end of said twist tube; detecting means responsive to rotation of the inner end of said twist tube relative to said housing for producing an output having a magnitude that varies in accordance with such rotation of the inner end of said twist tube; and means controlled by the output of said detecting means for rotating said shaft in such a direction and in such an amount as to cause said torque-applying means to produce a counter-torque on said inner end to substantially neutralize rotation of the inner end of said twist tube.

References Cited in the file of this patent

UNITED STATES PATENTS

| | | |
|---|---|---|
| 48,331 | Wigal | June 20, 1865 |
| 395,279 | Jurgens | Dec. 25, 1888 |
| 1,943,850 | Truman | Jan. 16, 1934 |
| 1,983,305 | Paulin | Dec. 4, 1934 |
| 2,441,468 | Brownscombe | May 11, 1948 |
| 2,509,644 | Kinderman | May 30, 1950 |
| 2,531,414 | Engvall | Nov. 28, 1950 |
| 2,563,899 | Wiancko | Aug. 14, 1951 |
| 2,593,339 | Ostermann et al. | Apr. 15, 1952 |
| 2,614,425 | Falk | Oct. 21, 1952 |
| 2,631,272 | Smith | Mar. 10, 1953 |
| 2,751,576 | Soergel et al. | June 19, 1956 |

FOREIGN PATENTS

| | | |
|---|---|---|
| 12,339 | Great Britain | of 1849 |